April 17, 1962  D. M. NELSON  3,029,701
REAR VIEW MIRRORS
Filed Feb. 6, 1958  2 Sheets-Sheet 1
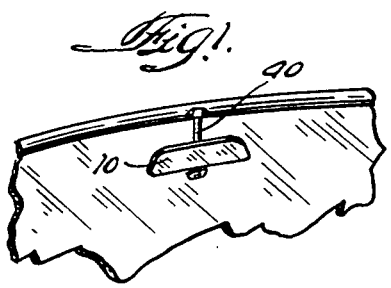
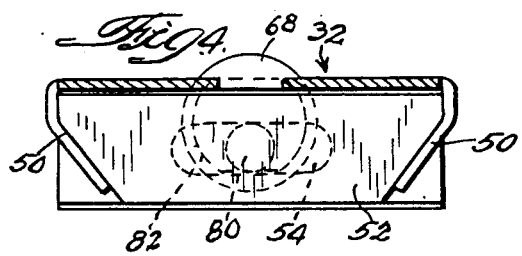
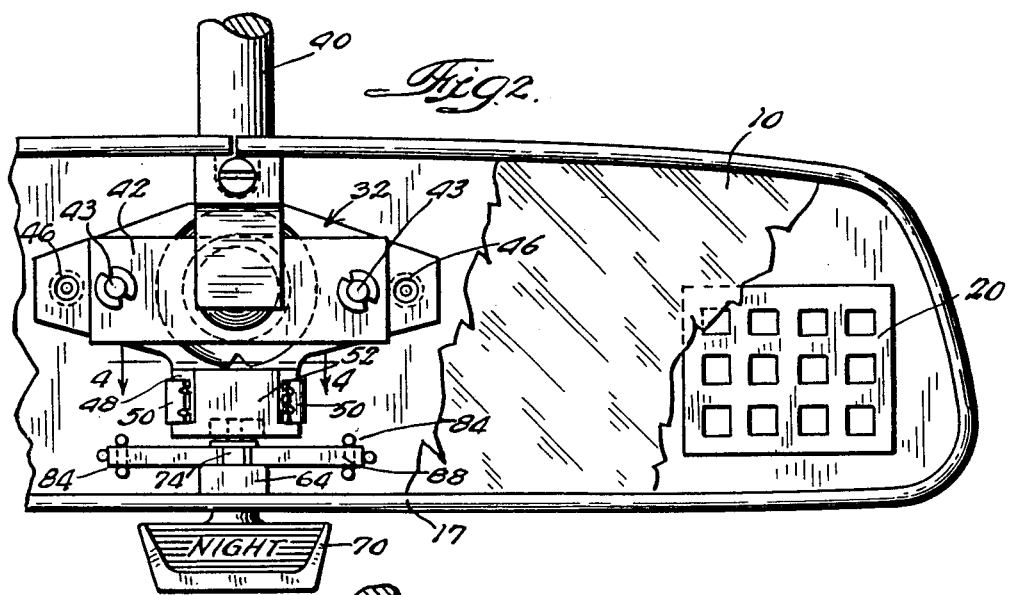
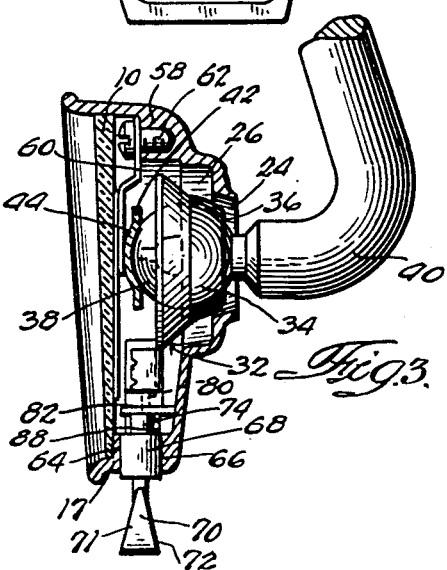
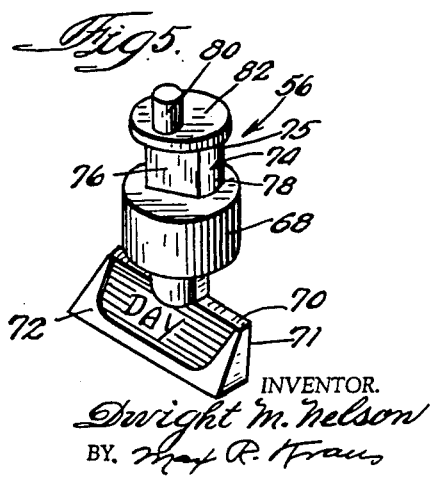
INVENTOR.
Dwight M. Nelson

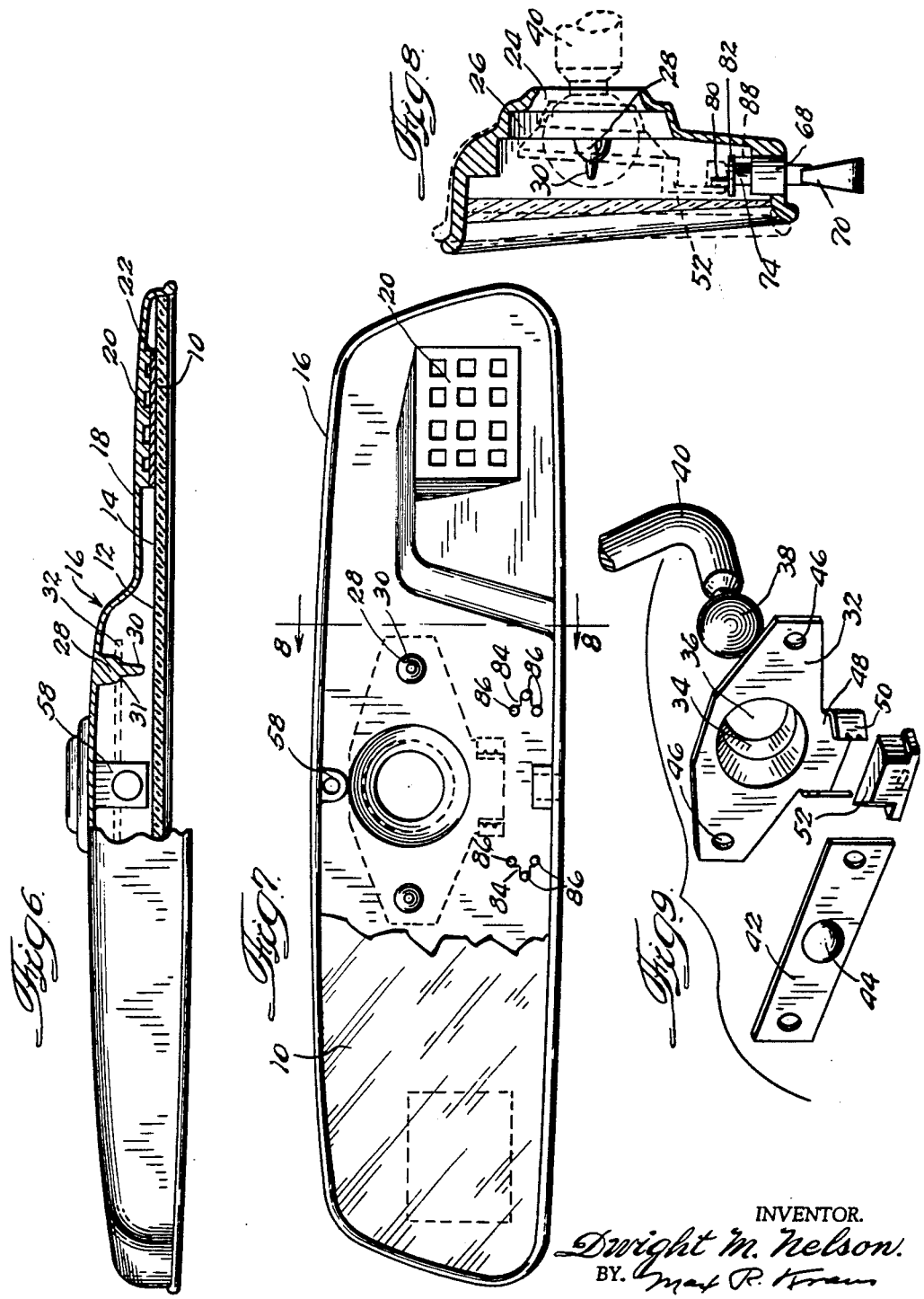

United States Patent Office 3,029,701
Patented Apr. 17, 1962

3,029,701
REAR VIEW MIRRORS
Dwight M. Nelson, 1410 Fisher Bldg., Detroit, Mich.
Filed Feb. 6, 1958, Ser. No. 713,757
3 Claims. (Cl. 88—77)

This invention relates to improvements in rear view mirrors.

One of the objects of this invention is to provide a rear view mirror with rotatable means for selectively changing the position of the reflective panel or reflector, so that by tilting the reflector slightly the driver can bring to the eyes either a dim or a bright image of the same object.

At present there are on the market various types of two position rear view mirrors, however, the reflector is manually flipped from one position to another and by such manual flipping too much pressure is usually exerted by the operator so that the focus of the entire mirror is thrown out of line and consequently the entire mirror has to be continually readjusted.

With this invention the foregoing disadvantages are eliminated in that the reflector is moved to either of its selective positions by a slight rotation of a knob, thus eliminating the necessity of any manual pressure or exertion and eliminating the possibility of throwing the mirror out of its aligned position.

Another object of this invention is to provide a mirror of the foregoing character which may be efficiently and economically mass produced.

Other objects will become apparent as this description progresses.

In the drawings:

FIG. 1 is a view showing the attachment of the rear view mirror to the vehicle.

FIG. 2 is a front elevational view of a portion of the unit with the reflector removed to show the operating parts.

FIG. 3 is a view partly in cross section taken on lines 3—3 of FIG. 2 and showing the position of the parts for nighttime driving.

FIG. 4 is an enlarged view partly in cross section taken on lines 4—4 of FIG. 2.

FIG. 5 is an enlarged perspective view of the actuating member.

FIG. 6 is a top plan view partly in section.

FIG. 7 is a front view with the operating parts removed and showing the housing or casing.

FIG. 8 is a cross sectional view taken on lines 8—8 of FIG. 7 and showing in full lines the position of the casing and reflector for daytime driving and showing in dotted lines the position for nighttime driving, and FIG. 9 is an exploded perspective view of the parts comprising the bracket assembly.

The invention is shown in connection with a prismoidal mirror or reflector which is generally indicated at 10. The prismoidal mirror which is well known in the art is made of a generally rectangular plate of glass with flat front and rear surfaces disposed vertically at such an angle to each other as to separate the images from the front and rear surfaces sufficiently that at the distance of the driver's eyes from the mirror only one of them at a time is perceptible. The mirror or reflector is thereby wedge shaped in vertical section and is arranged with its thicker part at the upper end. The glass plate is provided on its rear face 12 with a coating 14 of reflective material such as silver.

The mirror is rigidly secured to a metal casing or housing 16 so that the mirror or reflector 10 is immovable with respect to its supporting casing or housing 16. The rear wall 18 of the housing is offset forwardly at its opposite sides and is provided with a pair of spaced attaching wall surfaces 20 to which the prismatic mirror or reflector 10 is secured. The rear surface of the prismatic mirror has secured to it a thin piece of cardboard 22 and said cardboard is adhesively secured to the attaching wall surfaces 20 so that the reflector becomes affixed thereto and is not movable with respect to the casing. The front of the mirror or reflector 10 extends rearwardly of the front marginal flanges extending around the borders of the casing, as best seen in FIG. 3.

The rear wall or back 18 of the casing 10 is provided with a central opening 24 and the metal surrounding the opening is recessed to provide an annular well 26 inside of the rear wall. The rear wall is formed to provide a pair of forwardly extending bosses 28, one on each side of the opening 24. The bosses are reduced at the front thereof as at 30 for the purpose of receiving the trip bracket generally indicated at 32. The trip bracket 32 is shaped to provide a central socket portion 34 having an opening 36 to receive a ball 38 which, in turn, is secured to an arm 40. A strip of spring steel 42 is riveted as at 43 to the trip bracket 32 and extends across the front of the ball. The strip 42 is provided with a seat 44 which engages the ball 38 and frictionally clamps the ball 38 between the strip 42 and the trip bracket 32 and retains the ball 38 in the socket 34 in a frictional tight fit. The trip bracket 32 is provided adjacent each of its sides with an opening 46 which fits on the reduced portions 30 of the bosses 28. It will be seen that the openings 46 are larger than the reduced bosses 30 and that the ends of the bosses are rounded as at 31. This permits the housing 16 to pivot or tilt with respect to the trip bracket 32, as will be more fully explained hereinafter.

The trip bracket 32 has a reduced lower extension 48 centrally thereof with the opposite ends 50 of the extension turned forwardly to clampingly engage a nylon bearing block generally indicated at 52. The bottom of the nylon bearing block is provided with an elongated recess 54 within which is located the pin end of the actuating member generally indicated at 56.

The rear wall 18 of the casing 16 above the opening 24 is provided with an internally threaded boss 58. The trip bracket 32 and the assembly supported thereby, namely, the ball 38 and arm 40, as well as the nylon bearing block 52, are secured to the casing 16 by means of a spring clip 60 which is provided with an opening at the top thereof through which extends a threaded bolt 62 for engagement with the threaded boss 58. The spring clip 60 is offset forwardly and extends over the parti-spherical portion 44 of the strip 42 and serves to secure the trip bracket assembly to the casing. It, however, permits pivoting of the casing 16 and the reflector 10 as a unit with respect to the trip bracket assembly.

The lower forwardly extending flange 17 of the casing is provided with a centrally located rectangular shaped bossing 64 having an opening 66 which receives the stem portion 68 of the actuating member generally indicated at 56 and best shown in FIG. 5. Integrally formed with said stem portion 68 and extending below the casing is a finger engaging knob member 70 having opposed flat surfaces 71 and 72, one surface, namely 71, being marked Night and the opposite surface, namely 72, marked Day. Formed integrally with said stem portion 68 and extending upwardly thereof above the boss 64 is an extension 74, having opposite flat surfaces 75 and 76 parallel to each other. The opposite ends of the extension are rounded as at 78. Extending upwardly of the extension 74 and formed integrally therewith is a pin 80 which is offset with respect to the axis of the stem 68. The pin 80 is adapted to ride within the elongated recess 54 of the bearing block 52 for the purpose of pivoting the casing 16 and the reflector 10 as a unit with respect to the trip bracket assembly. Fixedly secured to the top of the extension 74 and below the pin 80 is small disc 82.

Extending forwardly of the bottom of the rear wall 18 of the casing 16 on each side of the boss 64 is a T shaped boss 84, each with three forwardly extending pins 86 which form a seat to receive the opposite ends of a flat spring 88 to support the spring in spaced relation to the back wall of the casing and in engagement with the extension 74 of the actuating member 56. It will be seen that the flat spring 88 engages the extension 74 and the spring is positioned above the rectangular boss 64 and below the collar or disc 82. The spring 88 will frictionally engage the extension 74 and while the actuating member 56 may be manually turned or rotated by engaging the knob 70, the spring 88 will retain the dial selector in its rotated position until it is again manually rotated. In other words, accidental displacement is entirely eliminated. The dial selector is intended to be rotated 180° in changing the position of the prismoidal mirror from daytime viewing to nighttime viewing and vice versa. When thus rotated either of the opposite flat surfaces 75 and 76 of the extension 74 will always be in engagement with the spring 88 and the spring bearing against either of the flat surfaces will maintain the structure in its adjusted position against movement due to vibration or other movements.

The arm 40 is suitably secured to the automobile in a manner well known in the art, as shown in FIG. 1, so that the entire mirror structure is positioned for rear view viewing by the driver of the vehicle.

Operation

The adjustment of the rear vision mirror is extremely simple. The mirror is first adjusted to align the mirror as a whole to reflect the view from the rear window of the automobile and this is effected by properly aligning the mirror by moving it through the ball 38 and socket connection 34. When thus aligned it may be adjusted for daytime or nighttime driving by merely rotating the dial selector or knob 70 180° to change the prismoidal reflector 10 from one position to another. The prismoidal mirror or reflector 10 is fixed to the housing or casing 16 and moves as an integral unit therewith so that by causing a tilt of the housing 16 with respect to the trip bracket assembly the prismoidal reflector is tilted for either driving conditions. For example, as shown in FIG. 3, the mirror and casing is positioned so that the secondary reflecting surface of the prismoidal mirror is visible and is suitable for nighttime driving. By rotating the selector dial 70, 180° from that shown in FIG. 3, the off-center pin 80 is moved or rotated in the nylon block 52 to a position forwardly from that shown in FIG. 3 to that shown in FIG. 5 and in full lines in FIG. 8, which will cause the casing 16 to pivot with respect to the trip bracket assembly and thereby tilt the casing and prismoidal reflector as a unit so that the primary reflecting surface of the mirror is in view for daytime driving. It remains in such position until the dial selector knob 70 is rotated 180° to again position the prismoidal mirror for nightime viewing.

It will be understood that various changes and modifications may be made from the foregoing without departing from the spirit and scope of the appended claims.

I claim:

1. An adjustable mounting for supporting from a stem having a ball at the free end thereof, a rear view mirror assembly having a casing, a reflective mirror secured to said casing as to be fixed to said casing, a supporting member mounted within said casing and enclosed by said casing, means on said supporting member for supporting said casing for pivotal movement about a horizontal axis with respect to said supporting member for changing the position of the reflective mirror to reflect to an observer images of different intensity, said supporting member having a front opening and a generally semi-spherical rear portion within which rear portion the ball is positioned and which limits the rearward movement of said ball for securing said supporting member to said stem, said semi-spherical portion having a rear opening for passage of said stem, means across the front opening of said supporting member and engaging said ball to frictionally retain the ball inside said supporting member between said means and the semi-spherical rear portion of the supporting member, a bearing member secured to said supporting member, a rotatable member supported by the lower end of said casing and extending exteriorly of said casing, said rotatable member mounted for rotation about an axis generally parallel to said reflective mirror, an off-center pin supported on said rotatable member and engaging said bearing member so that rotation of said rotatable member will cause said casing to pivot about a horizontal axis with respect to said supporting member in either of two selective positions to change the position of said reflective mirror.

2. An adjustable mounting for supporting from a stem having a ball at the free end thereof, a rear vision assembly having a casing and a reflective mirror secured to said casing as to be fixed to said casing, a supporting bracket mounted within said casing and enclosed by said casing, means on said supporting bracket for supporting said casing for pivotal movement about a horizontal axis with respect to said supporting bracket for changing the position of the reflective mirror to reflect to an observer images of different intensity, said bracket having a front opening and a generally semi-spherical rear portion within which rear portion said ball is positioned and which limits the rearward movement of said ball for securing said bracket to said stem, said semi-spherical portion having a rear opening for passage of said stem, means across the front opening of said supporting bracket and engaging said ball to frictionally retain the ball inside said supporting bracket between said means and the semi-spherical rear portion of the supporting bracket, a manually rotatable member mounted for rotation about an axis generally parallel to said reflective mirror, said rotatable member extending exteriorly of said casing and operatively connected to said supporting bracket so that rotation of said rotatable member will pivot said casing about a horizontal axis with respect to said supporting bracket to change the position of said reflective mirror, said rotatable member having opposed flat surfaces, and spring means engaging the flat surfaces of said rotatable member as each said flat surface is positioned adjacent the spring means to hold said rotatable member in position against accidental rotation and to maintain said casing in its adjusted position.

3. An adjustable mounting for supporting from a stem having a ball at the free end thereof, a rear vision mirror assembly having a casing, a reflective mirror secured to said casing as to be fixed to said casing, a supporting bracket mounted within said casing and enclosed by said casing, means on said supporting bracket for supporting said casing for pivotal movement about a horizontal axis with respect to said supporting bracket for changing the position of the reflective mirror to reflect to an observer images of different intensity, said bracket having a front opening and a semi-spherical shaped portion at the rear thereof adapted to be secured to said ball, said semi-spherical shaped portion limiting the rearward movement of said ball, said semi-spherical shaped portion having a rear opening for passage of said stem, means across the front opening of said supporting bracket and engaging said ball to frictionally retain the ball inside said supporting bracket between said means and the semi-spherical rear portion of the supporting bracket, a bearing member secured to the lower end of said bracket, a rotatable member supported at the lower end of said casing and extending exteriorly of said casing, said rotatable member mounted for rotation about an axis generally parallel to said reflective mirror, an off-center pin supported on said rotatable member and engaging said bearing member so that rotation of said rotatable member will cause said casing to pivot about a horizontal axis with respect to said supporting bracket in either of two selective positions to change the position of said reflective mirror, said rotatable member having opposed flat surfaces, and spring means engaging said rotatable member to engage said flat surfaces to restrict rotation of said rotatable member.

References Cited in the file of this patent

UNITED STATES PATENTS

| | | |
|---|---|---|
| 2,356,432 | Roedding | Aug. 22, 1944 |
| 2,645,158 | Bertell et al. | July 14, 1953 |
| 2,839,964 | Ponce | June 24, 1958 |

FOREIGN PATENTS

| | | |
|---|---|---|
| 839,129 | France | Dec. 26, 1938 |
| 757,974 | Great Britain | Sept. 26, 1956 |
| 787,779 | Great Britain | Dec. 18, 1957 |